(12) United States Patent
Takagi et al.

(10) Patent No.: US 9,860,493 B2
(45) Date of Patent: Jan. 2, 2018

(54) ILLUMINATION DEVICE AND PROJECTOR

(71) Applicant: SEIKO EPSON CORPORATION, Tokyo (JP)

(72) Inventors: Kunihiko Takagi, Okaya (JP); Hidefumi Sakata, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/040,385

(22) Filed: Feb. 10, 2016

(65) Prior Publication Data
US 2016/0241822 A1 Aug. 18, 2016

(30) Foreign Application Priority Data
Feb. 17, 2015 (JP) .................. 2015-028485

(51) Int. Cl.
*G03B 21/20* (2006.01)
*H04N 9/31* (2006.01)
*G02B 26/00* (2006.01)
*G02B 5/30* (2006.01)
(Continued)

(52) U.S. Cl.
CPC ......... *H04N 9/3111* (2013.01); *G02B 5/3083* (2013.01); *G02B 26/008* (2013.01); *G03B 21/16* (2013.01); *G03B 21/204* (2013.01); *H04N 9/3167* (2013.01); *G02B 27/141* (2013.01); *G03B 21/208* (2013.01); *H04N 9/3158* (2013.01)

(58) Field of Classification Search
CPC .. G03B 21/204; G03B 21/20; G03B 21/2033; G03B 21/208; H04N 9/3111; H04N 9/3152; H04N 9/3158; H04N 9/3161; H04N 9/3164; G02B 5/02; G02B 5/0273; G02B 5/0278; G02B 5/0284
See application file for complete search history.

(56) References Cited

U.S. PATENT DOCUMENTS 8,684,560 B2 4/2014 Sugiyama
8,820,940 B2 9/2014 Kita
(Continued)

FOREIGN PATENT DOCUMENTS

JP 2011-108535 A 6/2011
JP 2012-004009 A 1/2012
(Continued)

*Primary Examiner* — Ryan Howard
(74) *Attorney, Agent, or Firm* — Oliff PLC (57) ABSTRACT

An illumination device includes: a light-emitting element that emits light in a first wavelength band; a substrate rotatable about a predetermined axis of rotation; a phosphor layer that is provided on the substrate at a first distance from the axis of rotation and excited by the light in the first wavelength band to emit light in a second wavelength band different from the first wavelength band; a scattering layer that is provided on the substrate at a second distance, different from the first distance, from the axis of rotation and on which the light in the first wavelength band emitted from the light-emitting element is incident; a first pickup optical system that is provided on the side of the phosphor layer opposite to the substrate; and a second pickup optical system that is provided on the side of the scattering layer opposite to the substrate.

16 Claims, 6 Drawing Sheets

(51) Int. Cl.
G03B 21/16 (2006.01)
G02B 27/14 (2006.01)

(56) References Cited

U.S. PATENT DOCUMENTS

| 2014/0176916 A1* | 6/2014 | Masuda | H04N 9/31 353/38 |
| 2014/0285774 A1* | 9/2014 | Tajiri | G03B 21/28 353/38 |

FOREIGN PATENT DOCUMENTS

| JP | 2012-137608 A | 7/2012 |
| JP | 2014-006540 A | 1/2014 |

* cited by examiner

ILLUMINATION DEVICE AND PROJECTOR

BACKGROUND

1. Technical Field

The present invention relates to an illumination device and a projector.

2. Related Art

An illumination device including an excitation light source, such as a blue laser, and a phosphor layer that is excited by blue light emitted from the excitation light source to produce fluorescent emission has been known. For example, JP-A-2012-4009 discloses an illumination device including an excitation light source, a polarizing beam splitter (PBS), a condensing optical system, a fluorescent member including a phosphor layer and a reflective film, and a ¼-wave plate.

In this illumination device, S-polarized excitation light emitted from the excitation light source is incident on the PBS and reflected by the PBS. The excitation light reflected by the PBS is illuminated on the fluorescent member through the ¼-wave plate and the condensing optical system, and fluorescence in a different wavelength band from the excitation light is emitted from the phosphor layer. In the fluorescent member, the phosphor layer absorbs a portion of the excitation light to emit the fluorescence including red light and green light, while the reflective film reflects the remaining excitation light (blue light). Due to this, white light obtained by combining the fluorescence with the excitation light is emitted from the fluorescent member. The ¼-wave plate converts the S-polarized excitation light reflected by the PBS into circularly-polarized light, and also converts the circularly polarized excitation light emitted from the fluorescent member into P-polarized light. The condensing optical system condenses the excitation light emitted from the ¼-wave plate to a spot of a predetermined diameter on the phosphor layer, and also converts the white light emitted from the fluorescent member into parallel light.

In the illumination device disclosed in JP-A-2012-4009 as described above, light not contributing to wavelength conversion in the phosphor layer out of the excitation light is used as light for display. In order to obtain a predetermined amount of white light, the phosphor layer has to be irradiated with a large amount of excitation light. In that case, a thermal load applied to the phosphor layer is increased, so that the temperature of the phosphor layer rises. As a result, a problem of a reduction in the conversion efficiency of the phosphor layer occurs. Moreover, in the illumination device disclosed in JP-A-2012-4009, both the excitation light and the fluorescence emitted from the fluorescent member are extracted through the common condensing optical system. A focal position for the wavelength of the excitation light and a focal position for the wavelength of the fluorescence are shifted from each other due to axial chromatic aberration of the condensing optical system, and therefore, there is a problem of a reduction in condensing efficiency.

SUMMARY

An advantage according to an aspect of the invention is to provide an illumination device capable of reducing a thermal load to a phosphor layer and suppressing a reduction in condensing efficiency caused by a shift in focal position between excitation light and fluorescence. Another advantage according to an aspect of the invention is to provide a projector including the illumination device and thus having excellent display quality.

An illumination device according to an aspect of the invention includes: a light-emitting element that emits light in a first wavelength band; a substrate rotatable about a predetermined axis of rotation; a phosphor layer that is provided on the substrate at a first distance from the axis of rotation and excited by the light in the first wavelength band to emit light in a second wavelength band different from the first wavelength band; a scattering layer that is provided on the substrate at a second distance, different from the first distance, from the axis of rotation and on which the light in the first wavelength band emitted from the light-emitting element is incident; a first pickup optical system that is provided on the side of the phosphor layer opposite to the substrate; and a second pickup optical system that is provided on the side of the scattering layer opposite to the substrate.

In the illumination device according to the aspect of the invention, the light in the first wavelength band scattered by the scattering layer and the light in the second wavelength band emitted from the phosphor layer are emitted as light for illumination. Since the scattering layer and the phosphor layer are provided on the substrate at positions at different distances from the axis of rotation, a thermal load to the phosphor layer can be reduced. Moreover, since the first pickup optical system dealing with the light from the phosphor layer and the second pickup optical system dealing with the light from the scattering layer are independent of each other, these pickup optical systems can be optimized in response to a difference in wavelength band between the two lights. Due to this, the focal position of the first pickup optical system and the focal position of the second pickup optical system can be each optimized, so that extraction efficiency for both lights can be increased compared with the case of using a common pickup optical system. As a result, light use efficiency in an optical system after the illumination device can be increased.

In the illumination device according to the aspect of the invention, a distance between the phosphor layer and a light-receiving surface of the first pickup optical system may be different from a distance between the scattering layer and a light-receiving surface of the second pickup optical system.

According to this configuration, in response to a difference in wavelength band between the two lights, the focal position of the first pickup optical system and the focal position of the second pickup optical system can be set to respective desired positions.

The illumination device according to the aspect of the invention may further include: a first reflective portion that is provided on the substrate side of the phosphor layer; a second reflective portion that is provided on the substrate side of the scattering layer; a dichroic mirror on which the light in the first wavelength band emitted from the light-emitting element and the light in the second wavelength band emitted from the phosphor layer are incident and which has a polarization separation function for the light in the first wavelength band; and a first retardation film that is provided between the dichroic mirror and the scattering layer.

According to this configuration, the light in the second wavelength band wavelength-converted by the phosphor layer is reflected by the first reflective portion and emitted toward the first pickup optical system. The light in the first wavelength band scattered by the scattering layer is reflected by the second reflective portion and emitted toward the second pickup optical system. That is, the substrate including the phosphor layer, the first reflective portion, the scattering layer, and the second reflective portion functions as a reflective wavelength conversion element. In that case, the first pickup optical system not only extracts the light in the second wavelength band emitted from the phosphor layer but also functions as a condensing optical system that condenses the light in the first wavelength band traveling toward the phosphor layer. Similarly, the second pickup optical system not only extracts the light in the first wavelength band emitted from the scattering layer but also functions as a condensing optical system that condenses the light in the first wavelength band traveling toward the scattering layer.

In the illumination device according to the aspect of the invention, the first pickup optical system may include an achromatic lens.

By using the achromatic lens as a condensing optical system that condenses the light in the first wavelength band toward the phosphor layer, the focal length for the light in the first wavelength band can be the same as the focal length for the light in the second wavelength band. Due to this, it is possible to increase both the light use efficiency for the light in the first wavelength band as excitation light and the extraction efficiency for the light in the second wavelength band.

The illumination device according to the aspect of the invention may further include, on an optical path between the light-emitting element and the dichroic mirror, a second retardation film rotatable about a predetermined axis of rotation.

By rotating the second retardation film about the predetermined axis of rotation, it is possible to adjust the ratio of a P-polarization component to an S-polarization component relative to the dichroic mirror after passing through the retardation film. Due to this, it is possible to adjust the ratio of the amount of light incident on the phosphor layer to the amount of light incident on the scattering layer.

In the illumination device according to the aspect of the invention, the first pickup optical system may be movable in a direction parallel to an optical axis of the first pickup optical system, and the second pickup optical system may be movable in a direction parallel to an optical axis of the second pickup optical system.

According to this configuration, it is possible to easily adjust the distance between the phosphor layer and the light-receiving surface of the first pickup optical system and the distance between the scattering layer and the light-receiving surface of the second pickup optical system.

In the illumination device according to the aspect of the invention, the first distance may be longer than the second distance. In other words, the phosphor layer may be located closer to the outer peripheral side of the substrate than the scattering layer.

In general, when the amount of light radiated to the phosphor layer is equal to the amount of light radiated to the scattering layer, the amount of heat generation of the phosphor layer is larger than the amount of heat generation of the scattering layer. Moreover, when the substrate is rotated, the outer peripheral portion of the substrate is more cooled than the central portion of the substrate. Hence, according to the configuration, the temperature rise of the phosphor layer is easily suppressed, and thus a reduction in the efficiency of the phosphor layer caused by temperature rise is easily suppressed.

In the illumination device according to the aspect of the invention, the first distance may be shorter than the second distance. In other words, the phosphor layer may be located closer to the central side of the substrate than the scattering layer.

In general, the manufacturing cost of the phosphor layer is higher than the manufacturing cost of the scattering layer. Hence, according to the configuration, the amount of the phosphor layer used can be reduced compared with the case of disposing the phosphor layer on the outer peripheral side, and thus the manufacturing cost of the illumination device can be reduced.

A projector according to an aspect of the invention includes: the illumination device according to the aspect of the invention; a light modulator that modulates, in response to image information, light emitted from the illumination device to thereby form image light; and a projection optical system that projects the image light.

According to the aspect of the invention, since the illumination device according to the aspect of the invention is included, it is possible to provide a projector having excellent display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to FIGS. 1 to 6.

A projector of the first embodiment is an example of a liquid crystal projector including an illumination device that causes a phosphor layer to emit fluorescence using excitation light from a semiconductor laser.

Figure 1:
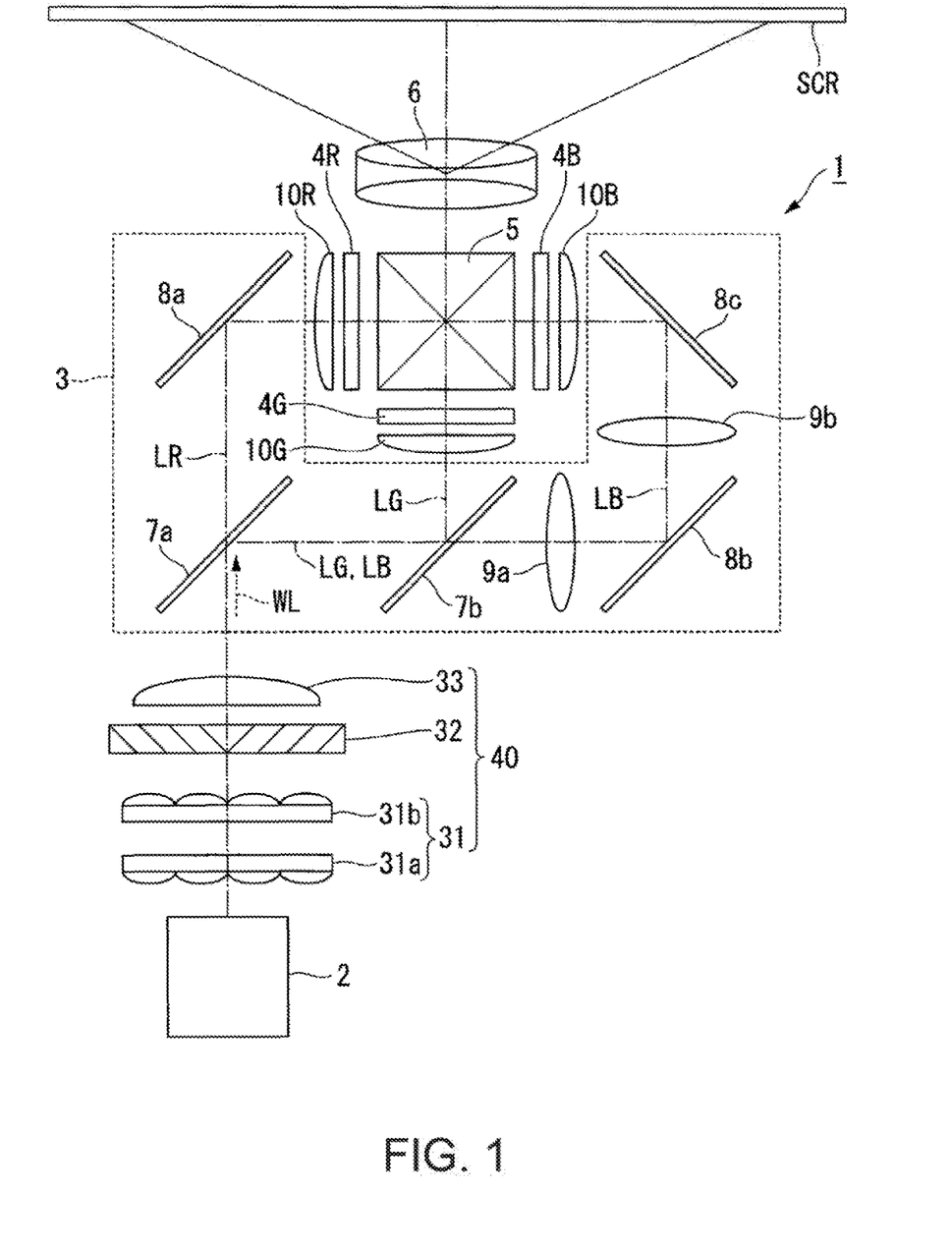
FIG. 1 is a diagram showing a schematic configuration of a projector of a first embodiment.

FIG. 1 is a diagram showing a schematic configuration of the projector of the first embodiment.

In the drawings below, components may be shown on different dimension scales for the sake of clarity of each of the components.

Projector

As shown in FIG. 1, the projector 1 of the embodiment is a projection-type image display device that displays a color video (image) on a screen (projected surface) SCR. The projector 1 includes three light modulators corresponding to respective colored lights, red light LR, green light LG, and blue light LB. The projector 1 uses, as a light source of an illumination device, a semiconductor laser (laser light source) from which high-luminance, high-output light is obtained.

The projector 1 includes an illumination device 2, a uniform illumination optical system 40, a color separation optical system 3, a light modulator 4R, a light modulator 4G, a light modulator 4B, a combining optical system 5, and a projection optical system 6. The illumination device 2 emits illumination light WL toward the uniform illumination optical system 40. An illumination device to which the invention is applied, described later, is used for the illumination device 2.

The uniform illumination optical system 40 includes an integrator optical system 31, a polarization conversion element 32, and a superimposing optical system 33. The uniform illumination optical system 40 uniforms the intensity distribution of the illumination light WL emitted from the illumination device 2 on an area to be illuminated. The illumination light WL emitted from the uniform illumination optical system 40 is incident on the color separation optical system 3.

The color separation optical system 3 separates the white illumination light WL into the red light LR, the green light LG, and the blue light LB. The color separation optical system 3 includes a first dichroic mirror 7a, a second dichroic mirror 7b, a first reflective mirror 8a, a second reflective mirror 8b, a third reflective mirror 8c, a first relay lens 9a, and a second relay lens 9b.

The first dichroic mirror 7a has a function of separating the illumination light WL from the illumination device 2 into the red light LR and light including the green light LG and the blue light LB. The first dichroic mirror 7a transmits the separated red light LR and reflects the light including the green light LG and the blue light LB. On the other hand, the second dichroic mirror 7b has a function of separating the light including the green light LG and the blue light LB into the green light LG and the blue light LB. The second dichroic mirror 7b reflects the green light LG and transmits the blue light LB.

The first reflective mirror 8a is disposed in the optical path of the red light LR and reflects the red light LR transmitted through the first dichroic mirror 7a toward the light modulator 4R. On the other hand, the second reflective mirror 8a and the third reflective mirror 8c are disposed in the optical path of the blue light LB and direct the blue light LB transmitted through the second dichroic mirror 7b to the light modulator 4B. The green light LG is reflected by the second dichroic mirror 7b toward the light modulator 4G.

The first relay lens 9a and the second relay lens 9b are disposed on the light-exiting side of the second dichroic mirror 7b in the optical path of the blue light LB. The first relay lens 9a and the second relay lens 9b have a function of compensating for light loss of the blue light LB due to the fact that the optical path length of the blue light LB is longer than the optical path length of the red light LR or the green light LG.

The light modulator 4R modulates the red light LR in response to image information to form image light corresponding to the red light LR. The light modulator 4G modulates the green light LG in response to image information to form image light corresponding to the green light LG. The light modulator 4B modulates the blue light LB in response to image information to form image light corresponding to the blue light LB.

For example, a transmissive liquid crystal panel is used for the light modulator 4R, the light modulator 4G, and the light modulator 4B. A polarizer (not shown) is provided on each of the incident and exiting sides of the liquid crystal panel.

A field lens 10R is provided on the incident side of the light modulator 4R. The field lens 10R collimates the red light LR incident on the light modulator 4R. Similarly, a field lens 10G is provided on the incident side of the light modulator 4G. The field lens 10G collimates the green light LG incident on the light modulator 4G. A field lens 10B is provided on the incident side of the light modulator 4B. The field lens 10B collimates the blue light LB incident on the light modulator 4B.

The combining optical system 5 combines the image lights corresponding to the red light LR, the green light LG, and the blue light LB, and emits the combined image light toward the projection optical system 6. For example, a cross dichroic prism is used for the combining optical system 5.

The projection optical system 6 is composed of a projection lens group including a plurality of lenses. The projection optical system 6 enlarges and projects the image light combined by the combining optical system 5 onto the screen SCR. Due to this, an enlarged color video (image) is displayed on the screen SCR.

Illumination Device

Figure 2:
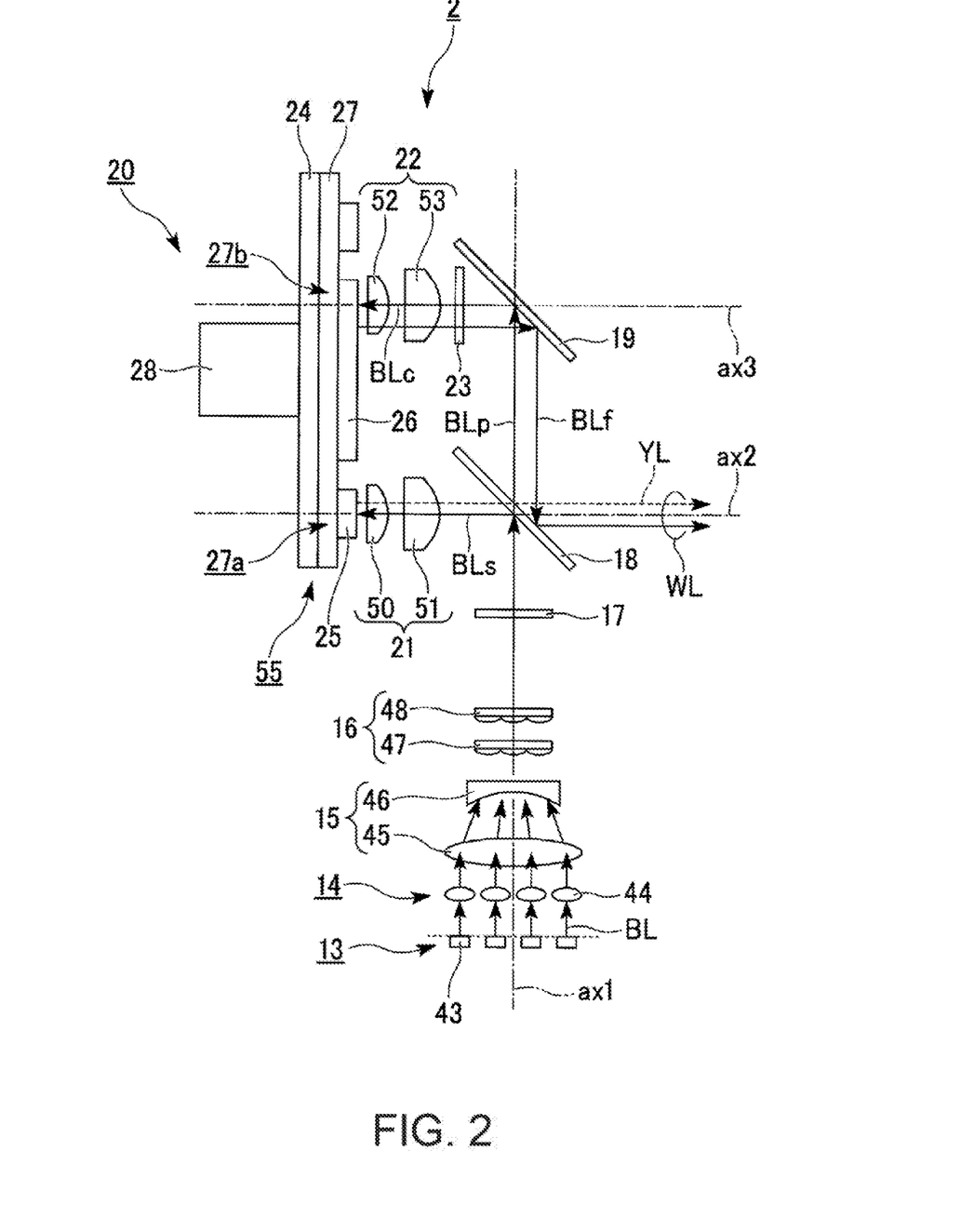
FIG. 2 is a plan view showing a schematic configuration of an illumination device of the first embodiment.

FIG. 2 is a side view showing a schematic configuration of the illumination device 2.

As shown in FIG. 2, the illumination device 2 includes an array light source 13, a collimator optical system 14, an afocal optical system 15, a homogenizer optical system 16, a second retardation film 17, a dichroic mirror 18, a mirror 19, a rotating wheel unit 20, a first pickup optical system 21, a second pickup optical system 22, and a first retardation film 23.

The array light source 13, the collimator optical system 14, the afocal optical system 15, the homogenizer optical system 16, the second retardation film 17, the dichroic mirror 18, and the mirror 19 are disposed on an optical axis ax1. The first pickup optical system 21 and the dichroic mirror 18 are disposed on an optical axis ax2. A phosphor layer 25 of the rotating wheel unit 20 is disposed on the optical axis ax2. The second pickup optical system 22, the first retardation film 23, and the mirror 19 are disposed on an optical axis ax3. A scattering layer 26 of the rotating wheel unit 20 is disposed on the optical axis ax3.

The optical axis ax1, the optical axis ax2, and the optical axis ax3 lie in the same plane, in which the optical axis ax1 and the optical axis ax2 are orthogonal to each other, and the optical axis ax1 and the optical axis ax3 are orthogonal to each other.

The array light source 13 includes a plurality of semiconductor lasers 43. The plurality of semiconductor lasers 43 are arranged in an array in a plane orthogonal to the optical axis ax1. The semiconductor laser 43 emits blue light BL as light in a first wavelength band. The semiconductor laser 43 emits, as the blue light BL, laser light having, for example, a peak wavelength of 460 nm. The blue light BL is emitted from the array light source 13 toward the dichroic mirror 18. The semiconductor laser 43 emits the blue light BL. The blue light BL is, for example, S-polarized light relative to the dichroic mirror 18.

The semiconductor laser 43 of the embodiment corresponds to a light-emitting element in the appended claims.

The blue light BL emitted from the array light source 13 is incident on the collimator optical system 14. The collimator optical system 14 converts the blue light BL emitted from the array light source 13 into a parallel light bundle. The collimator optical system 14 is composed of, for example, a plurality of collimator lenses 44 arranged in an array. The plurality of collimator lenses 44 are arranged in one-to-one correspondence with the plurality of semiconductor lasers 43.

The blue light BL emitted from the collimator optical system 14 is incident on the afocal optical system 15. The afocal optical system 15 adjusts the light bundle diameter of the entire blue light BL. The afocal optical system 15 is composed of, for example, an afocal lens 45 and an afocal lens 46.

The blue light BL emitted from the afocal optical system 15 is incident on the homogenizer optical system 16. The homogenizer optical system 16 converts the intensity distribution of the blue light BL into a uniform state (what is called top-hat distribution) on the area to be illuminated. The homogenizer optical system 16 is composed of, for example, a multi-lens array 47 and a multi-lens array 48.

The second retardation film 17 is provided on the optical path between the homogenizer optical system 16 and the dichroic mirror 18. The second retardation film 17 is composed of a ½-wave plate for the wavelength 460 nm of the blue light BL. The optic axis of the second retardation film 17 intersects the polarization axis of the blue light BL incident on the second retardation film 17. The optic axis of the second retardation film 17 may be the fast axis or slow axis of the second retardation film 17.

The blue light BL is S-polarized light immediately after being emitted from the semiconductor laser 43. However, since the polarization axis of the blue light BL intersects the optic axis of the second retardation film 17, a portion of the S-polarized light is converted into P-polarized light by the transmission of the blue light BL through the second retardation film 17. As a result, the blue light BL transmitted through the second retardation film 17 becomes mixed light of an S-polarization component and a P-polarization component at a predetermined ratio.

The second retardation film 17 may be rotatable about the axis of rotation parallel to the optical axis ax1. In this case, by rotating the second retardation film 17 about the axis of rotation, it is possible to change the mixing ratio of the S-polarization component to the P-polarization component in the blue light BL transmitted through the second retardation film 17. Due to this, it is possible to change the ratio of the amount of light incident on the phosphor layer 25 to the amount of light incident on the scattering layer 26. As a result, the ratio of the amount of fluorescent light emitted from the phosphor layer 25 to the amount of blue light emitted from the scattering layer 26 is changed, and therefore, the white balance of the illumination light can be adjusted.

The blue light BL emitted from the second retardation film 17 is incident on the dichroic mirror 18. The dichroic mirror 18 is disposed so as to form an angle of 45° relative to the optical axis ax1 and the optical axis ax2. The dichroic mirror 18 has a polarization separation function of separating the blue light BL into the S-polarization component and the P-polarization component relative to the dichroic mirror 18. Specifically, the dichroic mirror 18 reflects the S-polarization component of the blue light BL and transmits the P-polarization component of the blue light BL. In the following description, the S-polarization component reflected by the dichroic mirror 18 is referred to as "excitation light BLs" because the S-polarization component is used for exciting the phosphor layer 25. The P-polarization component transmitted through the dichroic mirror 18 is referred to as "blue light BLp" because the P-polarization component is used as a blue light component of the illumination light.

Moreover, the dichroic mirror 18 has a wavelength separation function of transmitting yellow fluorescent light YL in a different wavelength band from the blue light BL emitted from the semiconductor laser 43, irrespective of the polarization state of the fluorescent light YL.

The excitation light BLs reflected by the dichroic mirror 18 is incident on the first pickup optical system 21. The first pickup optical system 21 condenses the excitation light BLs toward the phosphor layer 25 of the rotating wheel unit 20. The first pickup optical system 21 is composed of a pickup lens 50 and a pickup lens 51. The excitation light BLs emitted from the first pickup optical system 21 is incident on the rotating wheel unit 20.

On the other hand, the blue light BLp transmitted through the dichroic mirror 18 is reflected by the mirror 19 and incident on the first retardation film 23. The first retardation film 23 is composed of, for example, a ¼-wave plate. The P-polarized blue light BLp passes through the first retardation film 23 and thus is converted into blue light BLc as circularly-polarized light.

The blue light BLc transmitted through the first retardation film 23 is incident on the second pickup optical system 22. The second pickup optical system 22 condenses the blue light BLc toward the scattering layer 26 of the rotating wheel unit 20. The second pickup optical system 22 is composed of a pickup lens 52 and a pickup lens 53. The circularly-polarized blue light BLc emitted from the second pickup optical system 22 is incident on the rotating wheel unit 20.

The rotating wheel unit 20 includes a rotating wheel 55 and a motor 28 that drives the rotating wheel 55. As the rotating wheel 55, for example, a circular plate is used. However, the shape of the rotating wheel 55 is not limited to the circular plate, and it is sufficient that the rotating wheel 55 has a flat plate shape. The motor 28 is electrically connected to a control unit (not shown), and the rotation of the rotating wheel 55 is controlled by the control unit. The rotating wheel 55 of the embodiment is a reflective rotating wheel. That is, the excitation light BLs and the blue light BLc are incident on one surface of the rotating wheel 55, and the fluorescent light YL produced by the phosphor layer 25 and scattered light BLf produced by the scattering layer 26 are emitted from the same surface of the rotating wheel 55 as that on which the excitation light BLs and the blue light BLc are incident.

The rotating wheel 55 includes a substrate 24, the phosphor layer 25, the scattering layer 26, and a reflective layer 27. In the case of the embodiment, the material of the substrate 24 may or may not be light-transmitting. However, it is preferable for the substrate 24 to use a material having a high thermal conductivity and excellent thermal resistance. As the material of the substrate 24, for example, metal such as aluminum is used. The phosphor layer 25 is provided on the outer peripheral side on one surface of the substrate 24 facing the first pickup optical system 21 and the second pickup optical system 22, and the scattering layer 26 is provided on the inner peripheral side.

Figure 3:
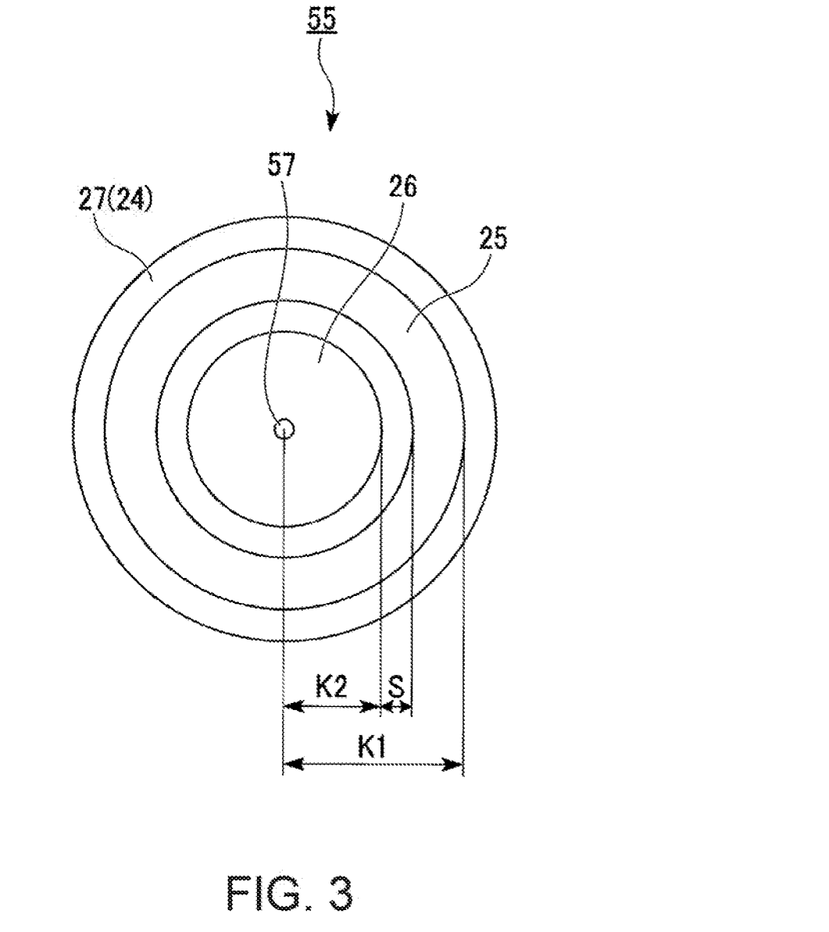
FIG. 3 is an elevation view of a rotating wheel.

FIG. 3 is an elevation view of the rotating wheel 55.

As shown in FIG. 3, in the rotating wheel 55, the phosphor layer 25 having an annular shape is provided on the outer peripheral side of the substrate 24. The scattering layer 26 having a circular shape is provided on the inner peripheral side of the substrate 24. The phosphor layer 25 and the scattering layer 26 are provided in a concentric manner with a predetermined gap s therebetween. The phosphor layer 25 and the scattering layer 26 may not always be separated from each other but may be in contact with each other. However, from the viewpoint of ensuring heat dissipation, the phosphor layer 25 and the scattering layer 26 are preferably separated from each other. The phosphor layer 25 is provided at a first distance K1 from an axis 57 of rotation. The scattering layer 26 is provided at a second distance K2, different from the first distance K1, from the axis 57 of rotation. In the case of the embodiment, K1>K2.

In the specification, the distance of the phosphor layer 25 from the axis 57 of rotation is defined as a distance between the center of the axis 57 of rotation and the outer edge of the phosphor layer 25. The distance of the scattering layer 26 from the axis 57 of rotation is defined as a distance between the center of the axis 57 of rotation and the outer edge of the scattering layer 26.

The phosphor layer 25 includes phosphor particles that emit fluorescence. The phosphor layer 25 absorbs the blue excitation light BLs, wavelength-converts the blue excitation light BLs into the yellow fluorescence YL, and emits the yellow fluorescence YL. The phosphor particle is a particulate fluorescent substance that absorbs the excitation light BLs and emits the fluorescence YL. For example, the phosphor particle includes a substance that is excited by blue light at a wavelength of about 460 nm to emit fluorescence, converts the excitation light BLs into the yellow fluorescence YL, and emits the yellow fluorescence YL. As the phosphor particle, for example, a YAG (yttrium-aluminum-garnet) based phosphor can be used. The forming material of phosphor particles may be of one kind, or a forming material obtained by mixing particles formed using two or more kinds of materials may be used as phosphor particles.

The scattering layer 26 scatters the blue light BLc incident from the second pickup optical system 22, and allows scattered light having a predetermined angular distribution to be emitted. As the scattering layer 26, it is preferable to use a scattering layer that causes Lambertian reflection of the blue light BLc incident on the scattering layer 26. By the use of this type of scattering layer 26, it is possible to obtain the blue light BLc having an angular distribution equal to that of the fluorescence YL isotropically emitted by the phosphor layer 25. As the scattering layer 26, a scattering layer obtained by forming irregularities on the surface of a light transmissive material, a scattering layer obtained by dispersing, in a light transmissive material, particles having a refractive index different from that of the light transmissive material, or the like can be used.

As shown in FIG. 2, the reflective layer 27 is provided on the substrate 24 side of the phosphor layer 25 and the scattering layer 26. A portion of the reflective layer 27 located on the substrate 24 side of the phosphor layer 25 is referred to as "first reflective portion 27a". A portion of the reflective layer 27 located on the substrate 24 side of the scattering layer 26 is referred to as "second reflective portion 27b". The first reflective portion 27a reflects the fluorescence YL produced by the phosphor layer 25 toward the side opposite to the substrate 24 (the side on which the first pickup optical system 21 is provided). The second reflective portion 27b reflects the blue light BLc incident on the scattering layer 26 toward the side opposite to the substrate 24 (the side on which the second pickup optical system 22 is provided).

Although an example in which the first reflective portion 27a and the second reflective portion 27b are formed as an integrated reflective layer 27 has been described in the embodiment, the first reflective portion 27a and the second reflective portion 27b may be formed as separate reflective layers. Moreover, when the substrate is light-reflecting, there is no need to necessarily form the reflective layer, and the substrate may serve also as the first reflective portion and the second reflective portion.

The fluorescence YL emitted from the phosphor layer 25 passes again through the first pickup optical system 21 and is incident on the dichroic mirror 18. The dichroic mirror 18 transmits yellow light in a second wavelength band irrespective of the polarization state, and therefore, the fluorescence YL emitted from the phosphor layer 25 passes through the dichroic mirror 18.

On the other hand, the blue light BLC emitted from the scattering layer 26 is circularly-polarized light opposite to the circularly-polarized light before being incident on the scattering layer 26 due to reflection by the second reflective portion 27b. The blue light BLc emitted from the scattering layer 26 passes again through the second pickup optical system 22 and is incident on the first retardation film 23. The blue light BLc passes through the first retardation film 23 to thereby being converted into S-polarized blue light BLf, and is reflected by the dichroic mirror 19.

In this manner, the yellow fluorescent light YL emitted from the phosphor layer 25 and the blue light BLf emitted from the scattering layer 26 are combined by the dichroic mirror 18 to form the white illumination light WL. The illumination light WL is incident on the uniform illumination optical system 40 shown in FIG. 1.

Here, focusing on the difference in wavelength band between light that passes through the first pickup optical system 21 and light that passes through the second pickup optical system 22.

Figure 4A:
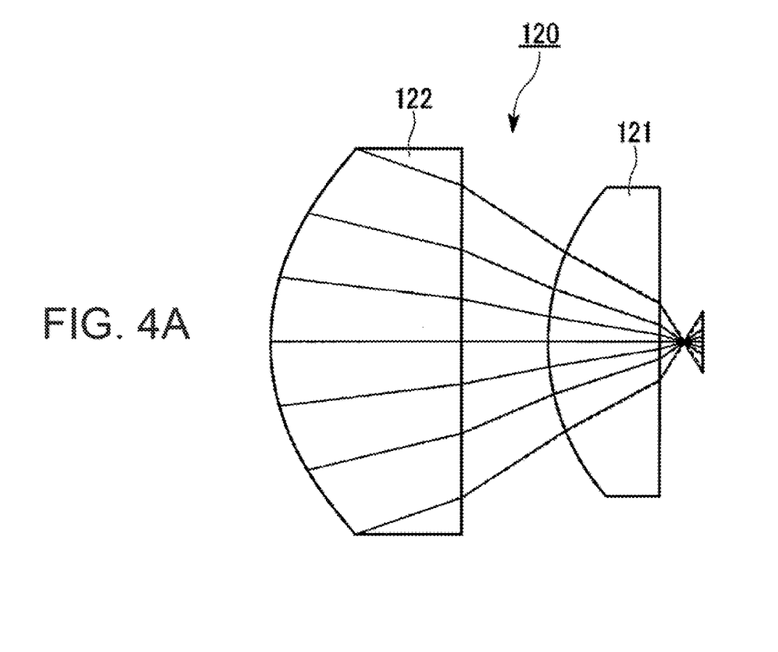
FIGS. 4A and B are diagrams for explaining axial chromatic aberration of a pickup optical system.
Figure 4B:
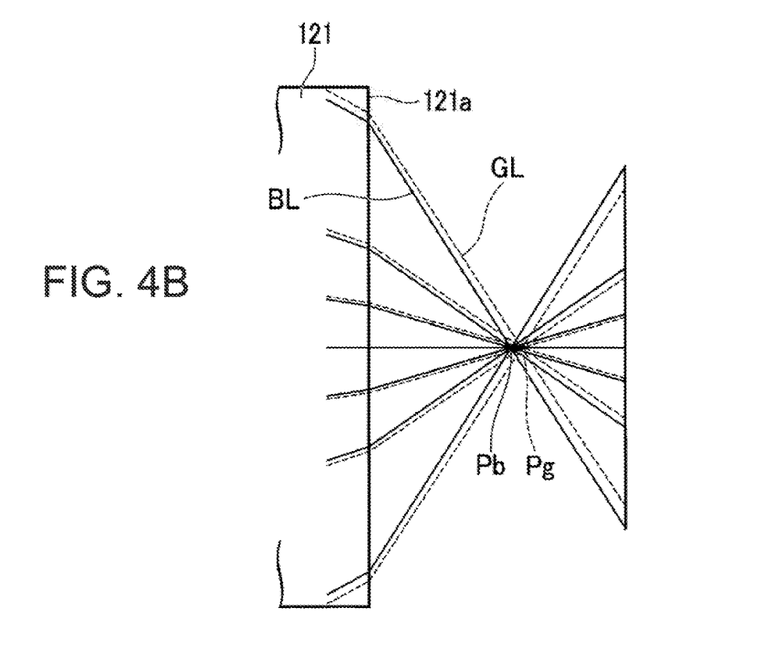

FIGS. 4A and 4B are diagrams for explaining axial chromatic aberration of a general pickup optical system, in which FIG. 4B is an enlarged view of a condensing position in FIG. 4A.

In FIG. 4B, the solid lines represent optical paths of light (blue light) at a wavelength of 450 nm, while the broken lines represent optical paths of light (green light) at a wavelength of 550 nm.

As shown in FIGS. 4A and 4B, a pickup optical system 120 includes a pickup lens 121 and a pickup lens 122. When the green light GL and the blue light BL having the same angular distribution are incident on the pickup optical system 120, the condensing position of the green light GL and the condensing position of the blue light BL are different from each other due to the influence of axial chromatic aberration of the pickup optical system 120. Specifically, a condensing position Pb of the blue light BL is closer to a light-exiting surface 121a of the pickup lens 121 than a condensing position Pg of the green light GL. An example of comparing the blue light at a wavelength of 450 nm with the green light at a wavelength of 550 nm has been described herein as one example. However, as the wavelength of light becomes shorter, the light condensing position comes closer to the pickup optical system due to the influence of axial chromatic aberration.

In the case of the embodiment, the wavelength band of the light emitted from the phosphor layer 25 and incident on the first pickup optical system 21 is different from the wavelength band of the light emitted from the scattering layer 26 and incident on the second pickup optical system 22. Therefore, a distance between the phosphor layer 25 and the first pickup optical system 21 is desirably made different from a distance between the scattering layer 26 and the second pickup optical system 22.

Figure 5:
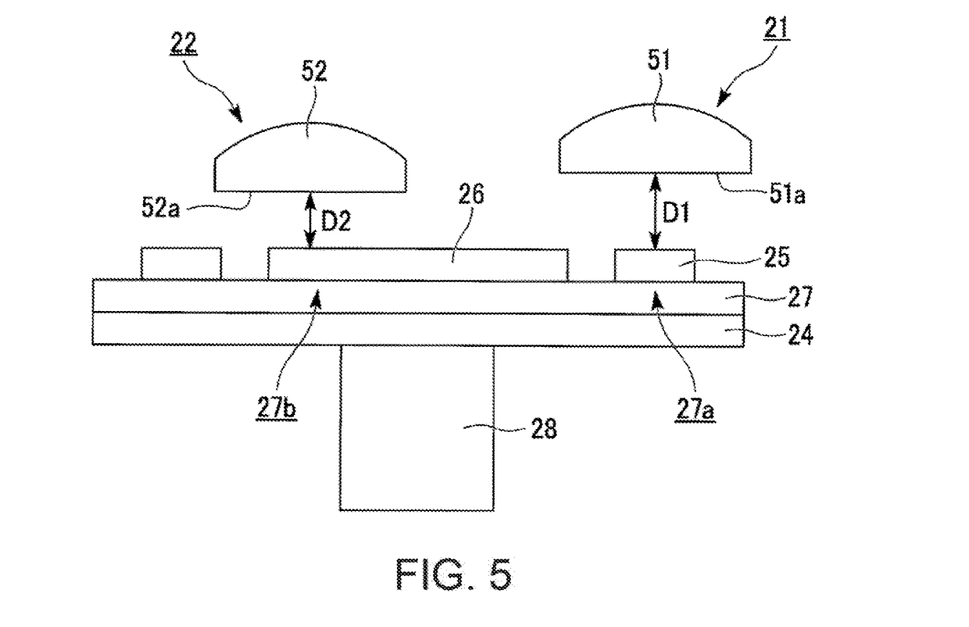
FIG. 5 is a diagram showing a positional relationship between a fluorescent light-emitting element and a condensing optical system.

Specifically, as shown in FIG. 5, a distance between the phosphor layer 25 and a light-receiving surface 51a of the pickup lens 51 of the first pickup optical system 21 is D1, and a distance between the scattering layer 26 and a light-receiving surface 52a of the pickup lens 52 of the second pickup optical system 22 is D2. Yellow fluorescent light is incident on the first pickup optical system 21, while blue light is incident on the second pickup optical system 22. Therefore, the wavelength band of the light incident on the first pickup optical system 21 is located on the longer wavelength side than the wavelength band of the light incident on the second pickup optical system 22. Hence, by satisfying D1>D2, both fluorescent light extraction efficiency and blue light extraction efficiency can be increased. Specifically, it is preferable to adjust the focal position of the first pickup optical system 21 with respect to the fluorescent light to the phosphor layer 25 and adjust the focal position of the second pickup optical system 22 with respect to the blue light to the scattering layer 26.

The first pickup optical system 21 may be movable in a direction parallel to the optical axis of the first pickup optical system 21. Similarly, the second pickup optical system 22 may be movable in a direction parallel to the optical axis of the second pickup optical system 22. Due to this, the distance D1 and the distance D2 can be set optimally.

In the illumination device 2 of the embodiment, the scattering layer 26 and the phosphor layer 25 are provided on the substrate at positions at different distances from the axis 57 of rotation. The light emitted from the array light source 13 is separated into two light bundles, and the light bundle is incident on the scattering layer 26 or the phosphor layer 25. Due to this, compared with a related-art configuration in which the whole light emitted from a light source is caused to be incident on a phosphor layer and both blue light and fluorescent light are extracted from the phosphor layer, a thermal load to the phosphor layer can be reduced.

Moreover, as described above, the first pickup optical system 21 for extracting the fluorescent light from the phosphor layer 25 and the second pickup optical system 22 for extracting the blue light from the scattering layer 26 are independent of each other. Therefore, the arrangement of these optical systems can be optimized in response to the difference in wavelength band between the lights incident thereon. Due to this, the focal position of the first pickup optical system 21 and the focal position of the second pickup optical system 22 can be each optimized, and compared with a related-art configuration in which a common pickup optical system is used, the extraction efficiency for each of the fluorescent light and the blue light can be increased. As a result, it is possible to increase light use efficiency in an optical system after the illumination device 2.

Figure 6:
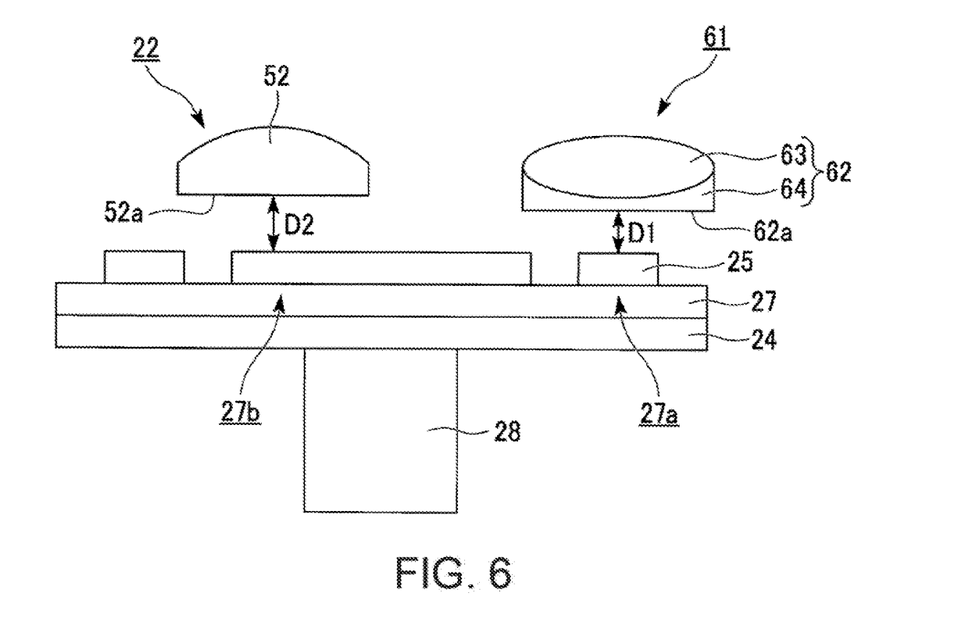
FIG. 6 is a diagram showing a modified example of the condensing optical system.

As shown in FIG. 6, a first pickup optical system 61 may include an achromatic lens 62. The achromatic lens 62 is a lens obtained by combining two lenses of different refractive indices and wavelength dispersions to reduce axial chromatic aberration. In this example, the achromatic lens 62 including a convex lens 63 and a concave lens 64 combined together is used.

In the case of the embodiment, the excitation light BLs directed from the dichroic mirror 18 to the phosphor layer 25 and the fluorescent light YL directed from the phosphor layer 25 to the dichroic mirror 18 are both incident on the first pickup optical system 21. Therefore, the convex lens 63 and the concave lens 64, which constitute the achromatic lens 62, are configured so as to have minimum axial chromatic aberration for the light in the blue wavelength band and the light in the yellow wavelength band. Due to this, it is possible to increase both condensing efficiency upon incidence of the excitation light emitted from the dichroic mirror 18 on the phosphor layer 25 and extraction efficiency upon extraction of the fluorescent light YL emitted from the phosphor layer 25.

In general, when the amount of light radiated to the phosphor layer is equal to the amount of light radiated to the scattering layer, the amount of heat generation of the phosphor layer is larger than the amount of heat generation of the scattering layer. Moreover, when the rotating wheel is rotated, the outer peripheral portion of the substrate is more cooled than the central portion of the substrate. In that regard, in the rotating wheel 55 of the embodiment, the phosphor layer 25 is provided on the outer peripheral side of the substrate 24, and the scattering layer 26 is provided on the inner peripheral side of the substrate. Therefore, the temperature rise of the phosphor layer 25 is easily suppressed, and thus a reduction in the conversion efficiency of the phosphor layer 25 caused by temperature rise is easily suppressed.

Second Embodiment

Hereinafter, a second embodiment of the invention will be described with reference to FIG. 7.

A basic configuration of an illumination device of the second embodiment is similar to that of the first embodiment, but differs from the first embodiment in that a transmissive rotating wheel is used.

Figure 7:
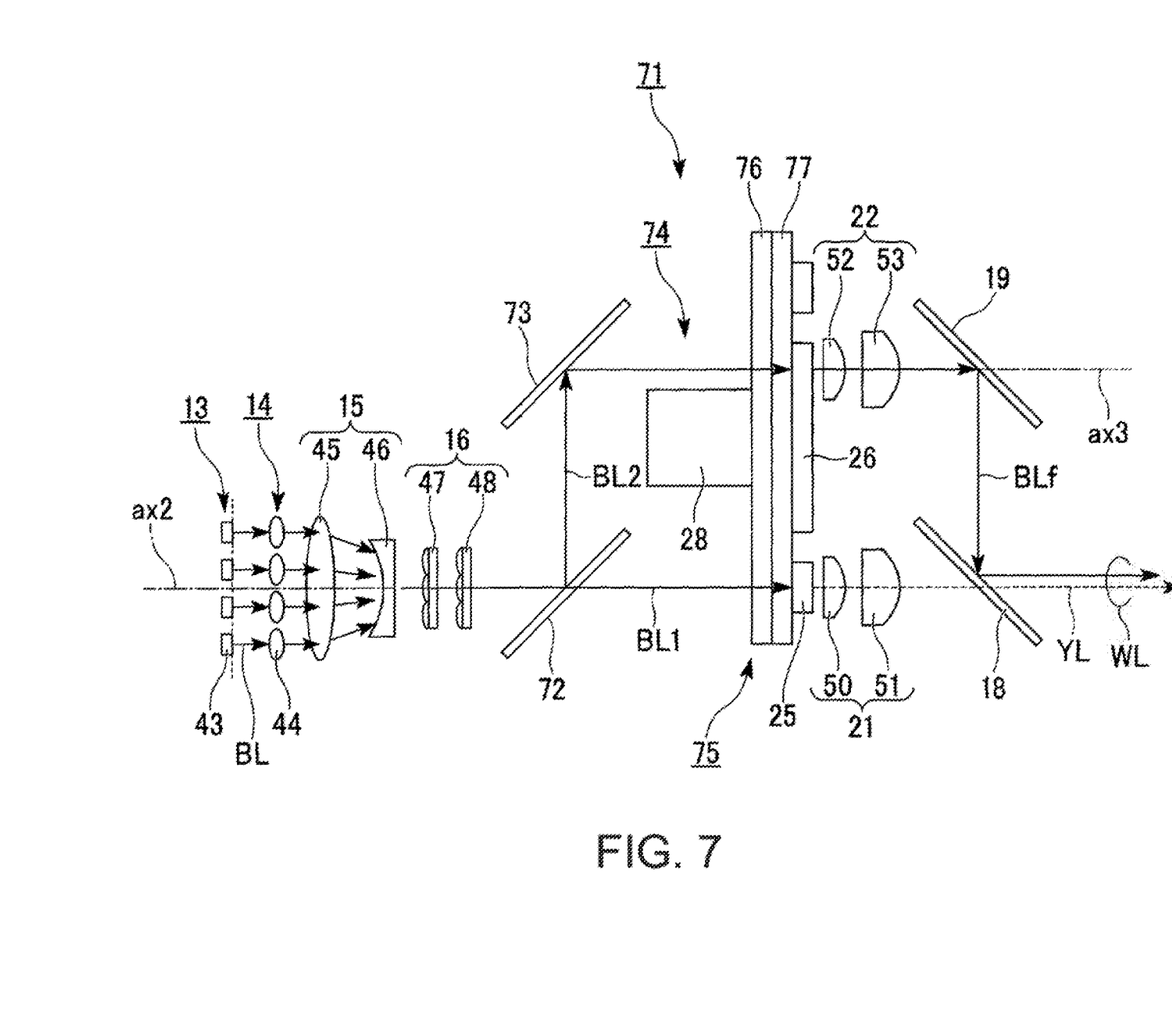
FIG. 7 is a plan view showing a schematic configuration of an illumination device of a second embodiment.

FIG. 7 is a schematic configuration diagram of the illumination device of the second embodiment.

In FIG. 7, components common to those in FIG. 2 used in the first embodiment are denoted by the same reference numerals and signs, and a description thereof is omitted.

As shown in FIG. 7, the illumination device 71 of the embodiment includes the array light source 13, the collimator optical system 14, the afocal optical system 15, the homogenizer optical system 16, a half-mirror 72, a mirror 73, a rotating wheel unit 74, the dichroic mirror 18, the mirror 19, the first pickup optical system 21, and the second pickup optical system 22. The array light source 13, the collimator optical system 14, the afocal optical system 15, the homogenizer optical system 16, and the half-mirror 72 are disposed along the optical axis ax2 on the side of a rotating wheel 75 opposite to the side thereof on which the phosphor layer 25 is provided.

The half-mirror 72 reflects a portion of incident light and transmits another portion thereof. The mirror 73 is provided on the optical path of the blue light BL reflected by the half-mirror 72. In the case of the embodiment, since a transmissive rotating wheel is used as the rotating wheel 75, a substrate 76 needs to be light-transmitting. Hence, as the material of the substrate 76, for example, glass is used.

A dichroic mirror 77 is provided on the substrate 76 side of the phosphor layer 25. The dichroic mirror 77 transmits blue light and reflects yellow light. Due to this, the dichroic mirror 77 transmits the blue light BL emitted from the array light source 13 while reflecting the fluorescent light YL produced by the phosphor layer 25 to the side opposite to the substrate 76 (the side on which the first pickup optical system 21 is provided). In the embodiment, the dichroic mirror 77 is provided on the entire surface of the substrate 76. However, it is sufficient for the dichroic mirror 77 to be provided at least between the phosphor layer 25 and the substrate 76.

The blue light BL emitted from the homogenizer optical system 16 is separated by the half-mirror 72 into two light bundles. Blue light BL1 (excitation light) transmitted through the half-mirror 72 passes through the substrate 76 and the dichroic mirror 77 and is incident on the phosphor layer 25. The fluorescent light YL produced by the phosphor layer 25 is emitted to the side opposite to the substrate 76 and incident on the first pickup optical system 21.

On the other hand, blue light BL2 reflected by the half-mirror 72 is reflected by the mirror 73, passes through the substrate 76 and the dichroic mirror 77, and is then incident on the scattering layer 26. The blue light BL2 scattered by the scattering layer 26 is emitted to the side opposite to the substrate 76 and incident on the second pickup optical system 22. In the case of the embodiment, unlike the first embodiment, the first pickup optical system 21 and the second pickup optical system 22 do not serve as a condensing optical system. The first pickup optical system 21 and the second pickup optical system 22 extract the fluorescent light YL emitted from the phosphor layer 25 and the blue light BLf emitted from the scattering layer 26, respectively.

Also in the illumination device 71 of the embodiment, it is possible to obtain advantageous effects similar to those of the first embodiment, such as capable of reducing a thermal load to the phosphor layer or capable of increasing condensing efficiency for each of the fluorescent light and the blue light.

The technical scope of the invention is not limited to the embodiments, and various alterations can be made within the scope not departing from the gist of the invention.

For example, in the rotating wheel of the embodiments, an example in which the phosphor layer is provided on the outer peripheral side of the substrate and the scattering layer is provided on the inner peripheral side of the substrate has been shown. Instead of this configuration, however, the phosphor layer may be provided on the inner peripheral side of the substrate and the scattering layer may be provided on the outer peripheral side of the substrate. In general, the manufacturing cost of the phosphor layer is higher than the manufacturing cost of the scattering layer. Hence, according to the configuration, the amount of the phosphor layer used can be reduced, and thus the manufacturing cost of the illumination device can be reduced.

Besides, the shape, number, arrangement, material, and the like of components of the illumination device and the projector are not limited to those of the embodiments, and can be appropriately changed. Moreover, although an example in which the illumination device according to the invention is mounted on the projector using the liquid crystal light valve has been shown in the embodiments, the invention is not limited to this example. The illumination device according to the invention may be mounted on a projector using a digital micromirror device as a light modulator.

Although an example in which the illumination device according to the invention is mounted on the projector has been shown in the embodiments, the invention is not limited to this example. The illumination device according to the invention can be applied also to a luminaire, a headlight of an automobile, or the like.

The entire disclosure of Japanese Patent Application No. 2015-028485, filed on Feb. 17, 2015 is expressly incorporated by reference herein.

What is claimed is:

1. An illumination device comprising:
   a light-emitting element that emits light in a first wavelength band;
   a substrate rotatable about a predetermined axis of rotation;
   a phosphor layer that is provided on the substrate at a first distance from the axis of rotation and excited by the light in the first wavelength band to emit light in a second wavelength band different from the first wavelength band;
   a scattering layer that is provided on the substrate at a second distance, different from the first distance, from the axis of rotation and on which the light in the first wavelength band emitted from the light-emitting element is incident;
   a first pickup optical system that is provided on the side of the phosphor layer opposite to the substrate; and
   a second pickup optical system that is provided on the side of the scattering layer opposite to the substrate, wherein a distance between the phosphor layer and a light-receiving surface of the first pickup optical system is different from a distance between the scattering layer and a light-receiving surface of the second pickup optical system.

2. The illumination device according to claim 1, wherein the first pickup optical system is movable in a direction parallel to an optical axis of the first pickup optical system, and the second pickup optical system is movable in a direction parallel to an optical axis of the second pickup optical system.

3. The illumination device according to claim 1, wherein the first distance is longer than the second distance.

4. The illumination device according to claim 1, wherein the first distance is shorter than the second distance.

5. A projector comprising:
   the illumination device according to claim 1;
   a light modulator that modulates, in response to image information, light emitted from the illumination device to thereby form image light; and
   a projection optical system that projects the image light.

6. A projector comprising: the illumination device according to claim 2; a light modulator that modulates, in response to image information, light emitted from the illumination device to thereby form image light; and a projection optical system that projects the image light.

7. A projector comprising: the illumination device according to claim 3; a light modulator that modulates, in response to image information, light emitted from the illumination device to thereby form image light; and a projection optical system that projects the image light.

8. A projector comprising: the illumination device according to claim 4; a light modulator that modulates, in response to image information, light emitted from the illumination device to thereby form image light; and a projection optical system that projects the image light.

9. An illumination device comprising:
   a light-emitting element that emits light in a first wavelength band;
   a substrate rotatable about a predetermined axis of rotation;
   a phosphor layer that is provided on the substrate at a first distance from the axis of rotation and excited by the light in the first wavelength band to emit light in a second wavelength band different from the first wavelength band;
   a scattering layer that is provided on the substrate at a second distance, different from the first distance, from the axis of rotation and on which the light in the first wavelength band emitted from the light-emitting element is incident;
   a first pickup optical system that is provided on the side of the phosphor layer opposite to the substrate;
   a second pickup optical system that is provided on the side of the scattering layer opposite to the substrate;
   a first reflective portion that is provided on the substrate side of the phosphor layer;
   a second reflective portion that is provided on the substrate side of the scattering layer;

a dichroic mirror on which the light in the first wavelength band emitted from the light-emitting element and the light in the second wavelength band emitted from the phosphor layer are incident and which has a polarization separation function for the light in the first wavelength band; and a first retardation film that is provided between the dichroic mirror and the scattering layer.

10. The illumination device according to claim 9, wherein the first pickup optical system includes an achromatic lens.

11. The illumination device according to claim 9, further comprising, on an optical path between the light-emitting element and the dichroic mirror, a second retardation film rotatable about a predetermined axis of rotation.

12. A projector comprising:

the illumination device according to claim 9;

a light modulator that modulates, in response to image information, light emitted from the illumination device to thereby form image light; and a projection optical system that projects the image light.

13. A projector comprising:

the illumination device according to claim 10;

a light modulator that modulates, in response to image information, light emitted from the illumination device to thereby form image light; and a projection optical system that projects the image light.

14. A projector comprising: the illumination device according to claim 11; a light modulator that modulates, in response to image information, light emitted from the illumination device to thereby form image light; and a projection optical system that projects the image light.

15. The illumination device according to claim 9, wherein the first distance is longer than the second distance.

16. The illumination device according to claim 9, wherein the first distance is shorter than the second distance.

* * * * *